G. WODTLI.
VERTICAL MOWER.
APPLICATION FILED JULY 29, 1910.
1,108,536.
Patented Aug. 25, 1914.
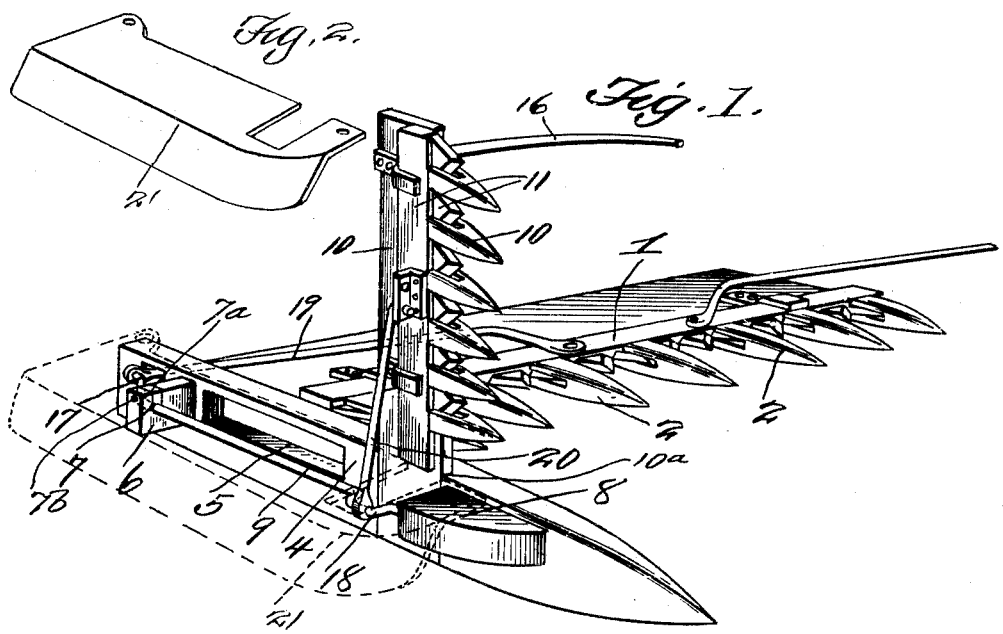
Witnesses
Francis G. Boswell
Markle Grange
Inventor
Gottlieb Wodtli
By D. Swift & Co.
Attorneys

UNITED STATES PATENT OFFICE.

GOTTLIEB WODTLI, OF SWEET HOME, OREGON.

VERTICAL MOWER.

1,108,536.  Specification of Letters Patent.  Patented Aug. 25, 1914.

Application filed July 29, 1910.  Serial No. 574,552.

*To all whom it may concern:*

Be it known that I, GOTTLIEB WODTLI, a citizen of the United States, residing at Sweet Home, in the county of Linn and State of Oregon, have invented a new and useful Vertical Mower; and I do hereby declare the following to be a full, clear, and exact description of the invention, such as will enable others skilled in the art to which it appertains to make and use the same.

The invention relates to improvements in mowers and has particular reference to an attachment to the ordinary horizontal mower.

One of the objects of the invention is to provide an improved device of this character by which the hay in the path of the mower is severed from the upstanding hay.

Another object of the invention is to provide an improved device of this character by which the upstanding hay in the path of the mower is severed from the remainder of the hay field before the same is mown down.

With these and other objects in view, the invention consists in the novel construction and arrangement of parts hereinafter described and shown and particularly pointed out in the appended claims.

In the drawings:—Figure 1 is a perspective view of the improved mower. Fig. 2 is a detail view of the shield.

Referring to the drawings, 1 designates the movable cutter bar of the horizontal finger bar. The outer end of the finger bar 2 is rigidly connected to a member 4, which is disposed transversely thereof. The member 4 is provided with a longitudinal slot 5, and also provided with bearing blocks 6 and 8. The bearing blocks 6 is provided with a vertically diposed slot 7, to receive one end portion of the crank shaft 9, the other end of the crank shaft is journaled in the block 8. This crank shaft 9 is provided with cranks 17 and 18 at its end portion. A filler block 7ª is inserted in the slot 7 to hold the shaft 9 in place, while a pin 7ᵇ extends transversely of the block 6 and through the filler block 7ª to hold the same securely in the slot 7. A pitman or connecting rod 19 connects the cutter bar 1 to the crank 17 of the shaft 9. The member 4 beyond the finger bar 2 is constructed with a recess 10ª, and dove-tailed in this recess 10ª is a vertical finger bar 10 having a cutter bar 11. A connecting rod or pitman 20 connects the cutter bar 11 to the crank 18, as shown. The finger bar 10 may be easily removed, likewise the crank shaft 9, in which the cutter bar 1 may operate just the same. A shield 21 is carried by the member 4 so as to protect the crank shaft and its connections.

Having thus described the invention, what is claimed is:—

1. In combination, a bar having a recess and provided with laterally extending offset bearing blocks, a horizontally arranged finger bar projecting laterally from the rear end of the first bar and provided with a cutter bar, a vertical finger bar secured in said recess in advance of the horizontal finger bar and provided with a cutter bar, a crank shaft having a crank at each end and mounted in the offset bearing blocks, one of the cranks having connections with the cutter bar of the vertical finger bar, the other crank having connections with the cutter of the horizontal finger bar, and means for detachably mounting one end of the crank shaft in one of the bearing blocks.

2. In combination, a bar having a recess and provided with laterally extending offset bearing blocks, a horizontally arranged finger bar projecting laterally from the rear end of the first bar and provided with a cutter bar, a vertical finger bar secured in said recess in advance of the horizontal finger bar and provided with a cutter bar, a crank shaft having a crank at each end and mounted in the offset bearing blocks, one of the cranks having connections with the cutter bar of the vertical finger bar, the other crank having connections with the cutter of the horizontal finger bar, and means for detachably mounting one end of the crank shaft in one of the bearing blocks, and a shield carried by the first bar for the crank shaft and its connections.

In testimony whereof I have signed my name to this specification in the presence of two subscribing witnesses.

GOTTLIEB WODTLI.

Witnesses:
  WILLIAM SCHOLL,
  EMMA WODTLI.

Copies of this patent may be obtained for five cents each, by addressing the "Commissioner of Patents, Washington, D. C."